US012604074B2

(12) United States Patent
Soeta et al.

(10) Patent No.: US 12,604,074 B2
(45) Date of Patent: Apr. 14, 2026

(54) IMAGE READING APPARATUS AND IMAGE FORMING SYSTEM

(71) Applicant: CANON KABUSHIKI KAISHA, Tokyo (JP)

(72) Inventors: Yukihiro Soeta, Kanagawa (JP); Teppei Nagata, Chiba (JP); Tomohito Nakagawa, Chiba (JP); Masaki Uchida, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 109 days.

(21) Appl. No.: 18/539,683

(22) Filed: Dec. 14, 2023

(65) Prior Publication Data

US 2024/0205523 A1     Jun. 20, 2024

(30) Foreign Application Priority Data

Dec. 19, 2022     (JP) ................................. 2022-202440

(51) Int. Cl.
| | |
|---|---|
| *H04N 23/51* | (2023.01) |
| *G02B 7/02* | (2021.01) |
| *H04N 1/00* | (2006.01) |
| *H04N 1/12* | (2006.01) |

(52) U.S. Cl.
CPC ............. *H04N 23/51* (2023.01); *G02B 7/028* (2013.01); *H04N 1/00013* (2013.01); *H04N 1/1235* (2013.01); *H04N 2201/0081* (2013.01)

(58) Field of Classification Search
CPC ............. H04N 1/00013; H04N 1/1235; H04N 2201/0081; H04N 23/51; G02B 7/028
See application file for complete search history.

(56) References Cited

U.S. PATENT DOCUMENTS

| | | | | |
|---|---|---|---|---|
| 11,622,059 B2 * | 4/2023 | Takayama | .............. | H04N 1/024 |
| | | | | 358/400 |
| 2010/0225983 A1 * | 9/2010 | Fujii | .................... | H04N 1/1235 |
| | | | | 358/498 |
| 2017/0054965 A1 * | 2/2017 | Raab | ...................... | G01B 11/25 |
| 2020/0016907 A1 | 1/2020 | Ogushi | | |
| 2021/0306504 A1 * | 9/2021 | Takayama | .......... | H04N 1/00591 |

FOREIGN PATENT DOCUMENTS

| | | |
|---|---|---|
| JP | 2020006628 A | 1/2020 |
| JP | 2021158440 A | 10/2021 |

\* cited by examiner

*Primary Examiner* — Amy R Hsu

(74) *Attorney, Agent, or Firm* — ROSSI, KIMMS & McDOWELL LLP

(57) ABSTRACT

An image reading apparatus includes a conveyance unit and a reading unit. The reading unit includes a transparent member, a sensor unit including a substrate to which an image reading element is connected, and configured to read an image of the sheet through the transparent member, a fan configured to blow air, a supporting member including an opening formed at a position where the opening faces the sensor unit, and supporting the sensor unit, and a casing accommodating the sensor unit, the fan, and the supporting member. The fan is disposed in a manner of facing the opening on a side, with respect to the opening, different from a side on which the sensor unit faces the opening. The sensor unit and the supporting member are disposed such that a flow path of air that has passed through the opening is formed between the sensor unit and the supporting member.

13 Claims, 10 Drawing Sheets

FIG.7

| MOVEMENT RATIO FROM CENTER OF CIS | AIR VELOCITY ON FRONT SIDE OF CIS | AIR VELOCITY ON BACK SIDE OF CIS | DIFFERENCE IN AIR VELOCITIES |
|---|---|---|---|
| 0% | GOOD | GOOD | GOOD |
| 20% | GOOD | GOOD | GOOD |
| 40% | ACCEPTABLE | GOOD | ACCEPTABLE |
| 60% | NO GOOD | SUFFICIENT | NO GOOD |

IMAGE READING APPARATUS AND IMAGE FORMING SYSTEM

BACKGROUND OF THE INVENTION

Field of the Invention

This disclosure relates to an image reading apparatus reading an image of a sheet and an image forming system to which this image reading apparatus has been applied.

Description of the Related Art

Hitherto, image forming systems including image reading apparatuses that read an image of a sheet on which image formation has been performed by the image forming systems are known. For example, there is widespread use of reading units in which reading sensors inside of the reading units are covered with glass and casings so as to prevent reading results from being influenced by foreign substances such as dust or dirt (Japanese Patent Laid-Open No. 2020-6628). In a case where the reading units adopt quasi-sealed structure, temperatures of light sources of the reading sensors and their surrounding areas are likely to become excessively hot. However, when openings are disposed in the reading units so as to suppress a temperature rise, the dust, dirt, etc. adhere to the reading units, and a decrease in reading quality is led.

To resolve this, configurations in which fans are disposed in an interior of the reading units so as to cool the interior by stirring internal air are developed (Japanese Patent Laid-Open No. 2021-158440). Since exterior air is not drawn into sealed spaces in which the reading sensors are housed, it becomes possible to suppress the temperature rises of the reading sensors through air agitation, while reducing risks of reading errors by the dust, dirt, etc.

However, there is a possibility that conventional configurations cannot sufficiently suppress the temperature rises of the reading units, and thus cause the decrease in the reading accuracy.

SUMMARY OF THE INVENTION

The purpose of this disclosure is to provide an image reading apparatus and an image forming system that can improve reading accuracy.

According to a first aspect of the present invention, an image reading apparatus configured to read an image on a sheet conveyed from an image forming apparatus that forms the image on the sheet, the image reading apparatus including a conveyance unit configured to convey the sheet in a sheet conveyance direction, and a reading unit configured to read image information of the sheet. The reading unit includes a transparent member, a sensor unit including a substrate to which an image reading element is connected, and configured to read an image of the sheet through the transparent member, a fan configured to blow air, a supporting member including an opening formed at a position where the opening faces the sensor unit, and configured to support the sensor unit, and a casing configured to accommodate the sensor unit, the fan, and the supporting member. The fan is disposed in a manner of facing the opening on a side, with respect to the opening, different from a side on which the sensor unit faces the opening. The sensor unit and the supporting member are disposed such that a flow path of air that has passed through the opening is formed between the sensor unit and the supporting member.

According to a second aspect of the present invention, an image forming system includes an image forming apparatus configured to form an image on a sheet, and an image reading apparatus including a reading unit configured to read the image of the sheet conveyed from the image forming apparatus. The reading unit includes a transparent member, a sensor unit including a substrate to which an image reading element is connected, and is configured to read the image of the sheet through the transparent member, a fan configured to blow air, a supporting member including an opening formed at a position where the opening faces the sensor unit, and configured to support the sensor unit, and a casing configured to accommodate the sensor unit, the fan, and the supporting member. The fan is disposed in a manner of facing the opening on a side, with respect to the opening, different from a side on which the sensor unit faces the opening. The sensor unit and the supporting member are disposed such that a flow path of air that has passed through the opening is formed between the sensor unit and the supporting member.

Further features of the present invention will become apparent from the following description of exemplary embodiments with reference to the attached drawings.

BRIEF DESCRIPTION OF THE DRAWINGS

FIG. 7 is a table illustrating a relationship between an installation position of an axial fan in the reading portion and a difference in airflow volume.

DESCRIPTION OF THE EMBODIMENTS

First Embodiment

Figure 1:
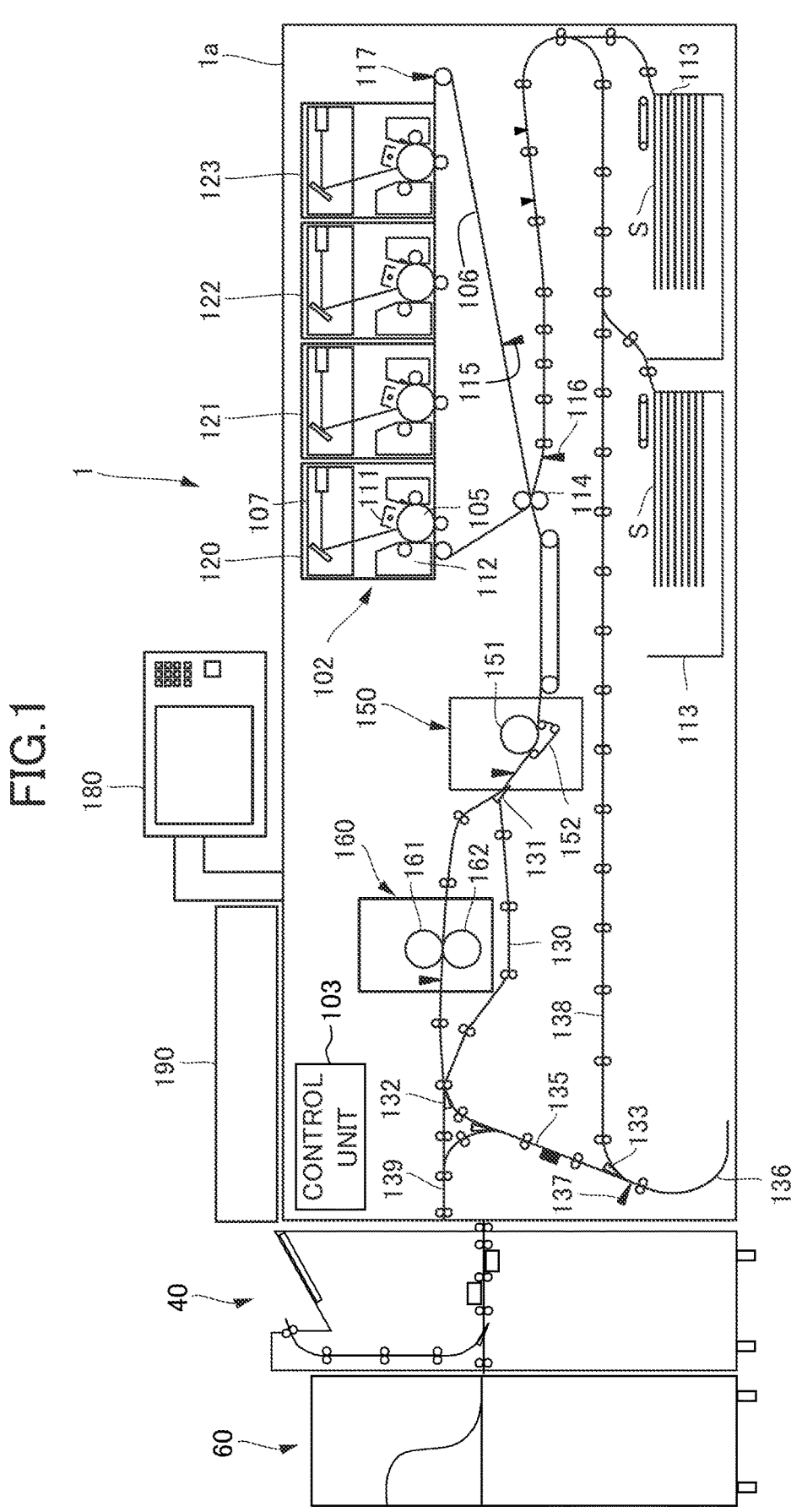
FIG. 1 is a cross-sectional view illustrating an image forming system of a first embodiment.
Figure 2:
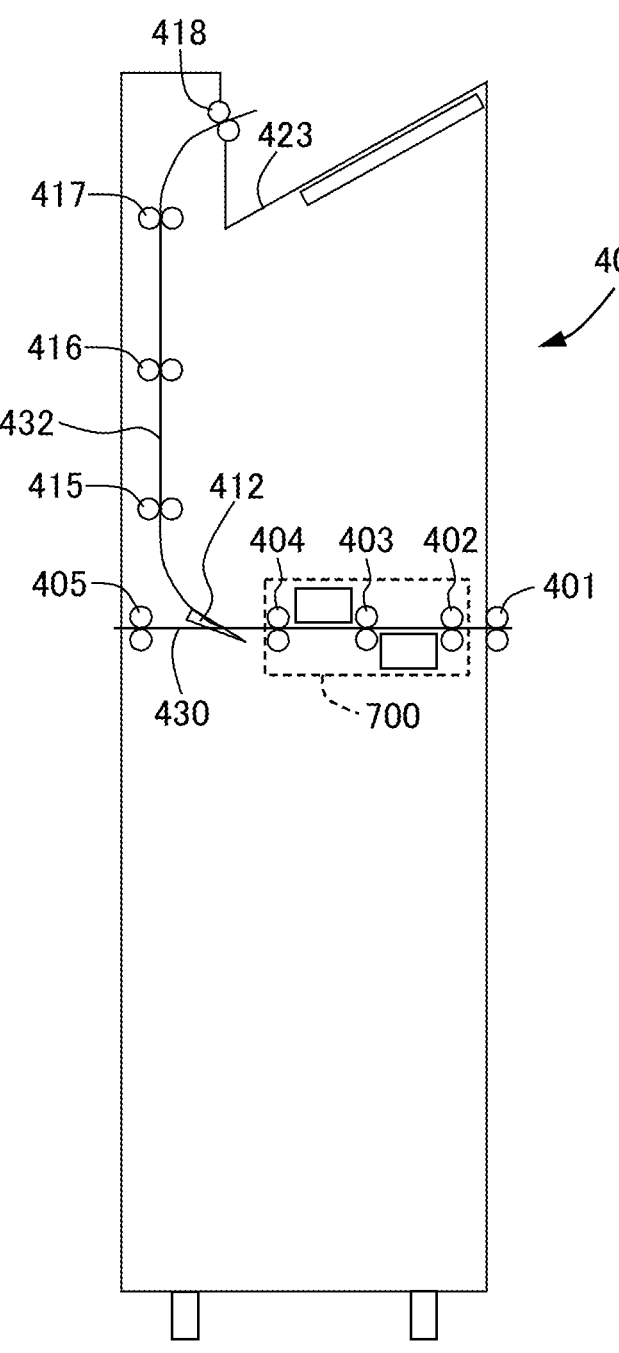
FIG. 2 is a cross-sectional view illustrating an adjusting apparatus of the first embodiment.

Hereinafter, with reference to FIGS. 1 to 7, a first embodiment of this disclosure will be described in detail. First, a schematic configuration of an image forming system 1 of this embodiment will be described using FIG. 1. FIG. 1 is a cross-sectional view illustrating the image forming system 1 of this embodiment. To be noted, in this embodiment, a full color copier of an electrophotographic system including a plurality of photosensitive drums is applied. However, it is not limited to this, and this disclosure can be applied also to a monochrome or a mono-color copier or printer including one photosensitive drum. Further, it is also not limited to the electrophotographic system, this disclosure can be also applied to such as an ink jet printer and a dye sublimation printer.

Image Forming Apparatus

The image forming system 1 includes an image forming apparatus 1a, an adjusting apparatus 40, and a sheet discharge apparatus 60. In the image forming apparatus 1a, a sheet S is conveyed from a sheet cassette 113 to an image forming unit 102, and a toner image is formed on the sheet S. The image forming apparatus 1a conveys the sheet S on which the toner image has been formed in the image forming unit 102 to fixing units 150 and 160, and, by applying heat and pressure, fixes an unfixed toner image on the sheet S on the sheet S. As the sheet S, paper such as thin paper and cardboard, a plastic film such as a sheet for an overhead projector (OHP), a surface treated sheet such as coated paper, a specially shaped sheet such as an envelope, and cloth are included.

The image forming unit 102 includes stations 120, 121, 122, and 123, and forms an image on the sheet conveyed by a sheet conveyance unit 10. The image forming apparatus 1a includes an intermediate transfer belt 106 and a secondary transfer outer roller 114. The stations 120, 121, 122, and 123 respectively form toner images of yellow, magenta, cyan, and black on the intermediate transfer belt 106. Configurations of the stations 121, 122, 122, and 123 are standardized except for differences in colors of toners. Therefore, the configuration of the station 120 will be described as an example, and the configurations of the other stations 121, 122, and 123 will be omitted herein.

A photosensitive drum 105, serving as an image bearing member, rotates in a counter-clockwise direction in FIG. 1. A primary charge unit 111 charges a surface of the photosensitive drum 105 to a uniform surface potential. A laser unit 108 includes a light source outputting a laser beam, and forms an electrostatic latent image on the photosensitive drum 105. A developing unit 112 forms the toner image by developing the electrostatic latent image formed on the photosensitive drum 105 by using developer containing toner. The toner images formed by the stations 120, 121, 122, and 123 are transferred onto the intermediate transfer belt 106. The secondary transfer outer roller 114 transfers the toner image on the intermediate transfer belt 106 onto the sheet S conveyed from the sheet cassette 113.

On the other hand, the sheet S fed from the sheet cassette 113 is conveyed to the secondary transfer outer roller 114 via the sheet conveyance unit 10. When the sheet S is brought into pressure contact with the intermediate transfer belt 106 in the secondary transfer outer roller 114, simultaneously, a bias voltage with an opposite characteristic to the toner is applied to the secondary transfer outer roller 114. Thereby, a visible image formed on the intermediate transfer belt 106 is secondarily transferred onto the sheet S that is synchronously conveyed by a sheet feed processing mechanism in a sub-scanning direction. A start position detection sensor 115 for determining a printing start position at a time of image formation, a sheet feed timing sensor 116 for measuring a timing of feeding the sheet S, and a density sensor 117 for measuring patch density during density control are arranged around the intermediate transfer belt 106. When performing the density control, density of each patch is measured by the density sensor 117.

The image forming apparatus 1a includes the first fixing unit 150 and the second fixing unit 160 for fixing the toner image transferred onto the sheet S by the heat and pressure. The first fixing unit 150 includes a fixing roller 151 for applying the heat to the sheet S, a press belt 152 bringing the sheet S into pressure contact with the fixing roller 151, and a post-fixing sensor 153 for detecting the completion of fixing. The fixing roller 151 is a hollow roller, and includes a heater inside. The fixing roller 151 conveys the sheet S by being rotatably driven. The second fixing unit 160 is located further downstream than the first fixing unit 150 in a sheet conveyance direction, and arranged for a purpose of applying gloss or ensuring fixation with respect to the toner image on the sheet S from the first fixing unit 150. Similar to the first fixing unit 150, the second fixing unit 160 includes a fixing roller 161, a press roller 162, and a post-fixing sensor 163.

Depending on a type of the sheet S, there is a case in which it is not necessary to pass through the second fixing unit 160. So as to reduce an energy consumption amount, a conveyance path 130 for discharging the sheet S without passing through the second fixing unit 160 in such a case is included. It is possible to guide the sheet S to the conveyance path 130 by a switching member 131.

A switching member 132 directs the sheet S, which has been conveyed via the image forming unit 102 and the fixing units 150 and 160, either to the outside of the image forming apparatus 1a or to a conveyance path 135. In a case of single sided printing, after having completed the image formation via the image forming unit 102 and the fixing units 150 and 160, the sheet S is guided to a conveyance path 139 by the switching member 132, and discharged outside.

In a case of duplex printing, after the single sided printing has been completed, the sheet S is reversed, and conveyed to the image forming unit 102 again. In particular, the switching member 132 guides the sheet S to a conveyance path 135 after the fixing, and the sheet S is conveyed to a reverse portion 136. When a reverse sensor 137 has detected a trailing edge of the sheet S, a switching member 133 switches a conveyance direction of the sheet S to a conveyance path 138. The sheet S that has been reversed is conveyed to the image forming unit 102 and further to the fixing units 150 and 160 again via the conveyance path 138. The sheet S on which the duplex printing has been completed is guided to the conveyance path 139 by the switching member 132, and discharged outside.

The image forming apparatus 1a includes a control unit 103. The control unit 103 includes a central processing unit (CPU), a random access memory (RAM), a read only memory (ROM), and an input/output (I/O), and controls each unit described above incorporated in the image forming system 1.

Adjusting Apparatus

The adjusting apparatus 40, serving as an example of an image reading apparatus, is arranged downstream of the image forming apparatus 1a in the sheet conveyance direction. In the adjusting apparatus 40 in which an entrance conveyance roller pair 401 conveying the sheet by receiving the sheet S from the image forming apparatus 1a, and a reading portion 700 are arranged in this order, and a switching portion 412 is arranged downstream of the reading unit 700. The switching portion 412 can switch the conveyance path to a through path 430 for delivering the sheet S to the sheet discharge apparatus 60 that is further downstream than the adjusting apparatus 40, and to a sheet discharge path 432 for discharging the sheet S to a fixed tray 423 on a top surface of the adjusting apparatus 40. When passing the sheet S to the through path 430, the switching portion 412 moves to an upper position, and the sheet S is delivered to the sheet discharge apparatus 60 on the downstream side via an exit conveyance roller pair 405 arranged downstream. Further, when passing the sheet S to the sheet discharge path 432, the switching portion 412 moves to a lower position, and the sheet S is discharged to the fixed tray 423 via conveyance roller pairs 415, 416, 417, and 418 arranged downstream.

Figure 3:
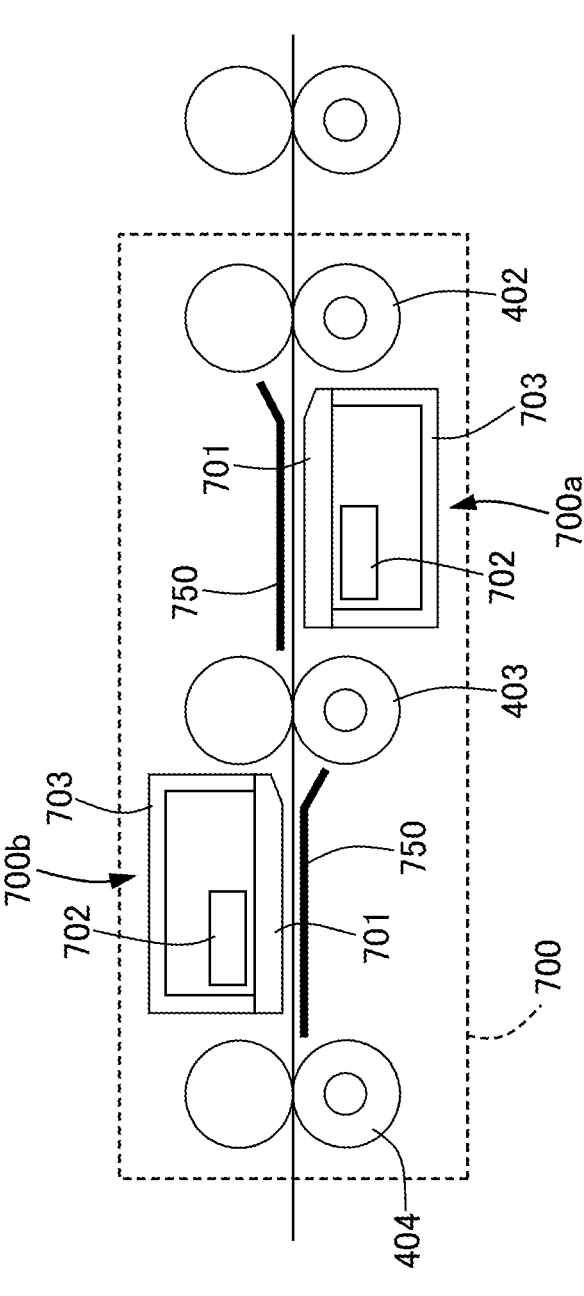
FIG. 3 is a cross-sectional view illustrating a reading portion of the first embodiment.

Using FIG. 3, a configuration of the reading portion 700 will be described. The reading portion 700 measures a shape and a positional relationship of an image pattern printed on the sheet S, and feeds back measurement results to the image forming apparatus 1a. Since, so as to obtain high precision measurement results, it is necessary to average variations in the shape and the printed position of each sheet, a plurality of sheets of the sheet S are measured. So as to reduce an adjustment time, while conveying the sheet S, measurement test patterns formed on the front side and the back side of the sheet S are read using a reading unit 700a for the back side and a reading unit 700b for the front side, which are arranged in directions opposite to each other. Further, since it is desirable to reduce the size of the device as much as possible, in the present embodiment, a contact image sensor (hereinafter referred to as a CIS) is used as a reading means.

The reading units 700a and 700b are disposed so as to read image information of the sheet, and each include the CIS 702, a transparent member 701 made of glass for stabilizing a position in a focal depth direction of the CIS, and a casing 703 that encloses the CIS 702. The CIS 702 is housed in a quasi-sealed space formed by the transparent member 701 and the casing 703. That is, the casing 703 includes an opening portion 703a opening to a side on which the sheet S is conveyed, and the transparent member 701, serving as an example of a transparent member, is disposed onto the opening portion 703a. The casing 703 houses the CIS 702, an axial fan 707, described below, and a CIS holder 704. A sheet conveyance roller pair 402 is arranged upstream of the reading unit 700a in the sheet conveyance direction. A sheet conveyance roller pair 403 is arranged between the reading units 700a and 700b in the sheet conveyance direction. A conveyance roller pair 404 is arranged downstream of the reading unit 700b in the sheet conveyance direction. A conveyance guide member 750 is arranged in a manner of facing the transparent members 701. The conveyance guide member 750 is a facing member that forms a conveyance path with the transparent member 701. It is acceptable that the conveyance guide member 750 is constituted by a roller. The conveyance guide member 750 serves as black backing for enhancing a contrast with an edge of the sheet. To be noted, the sheet conveyance roller pairs 402, 403, and 404 are examples of a conveyance unit conveying the sheet in the sheet conveyance direction, and are driven by a drive unit using such as a motor, not shown.

Reading Unit

Figure 4:
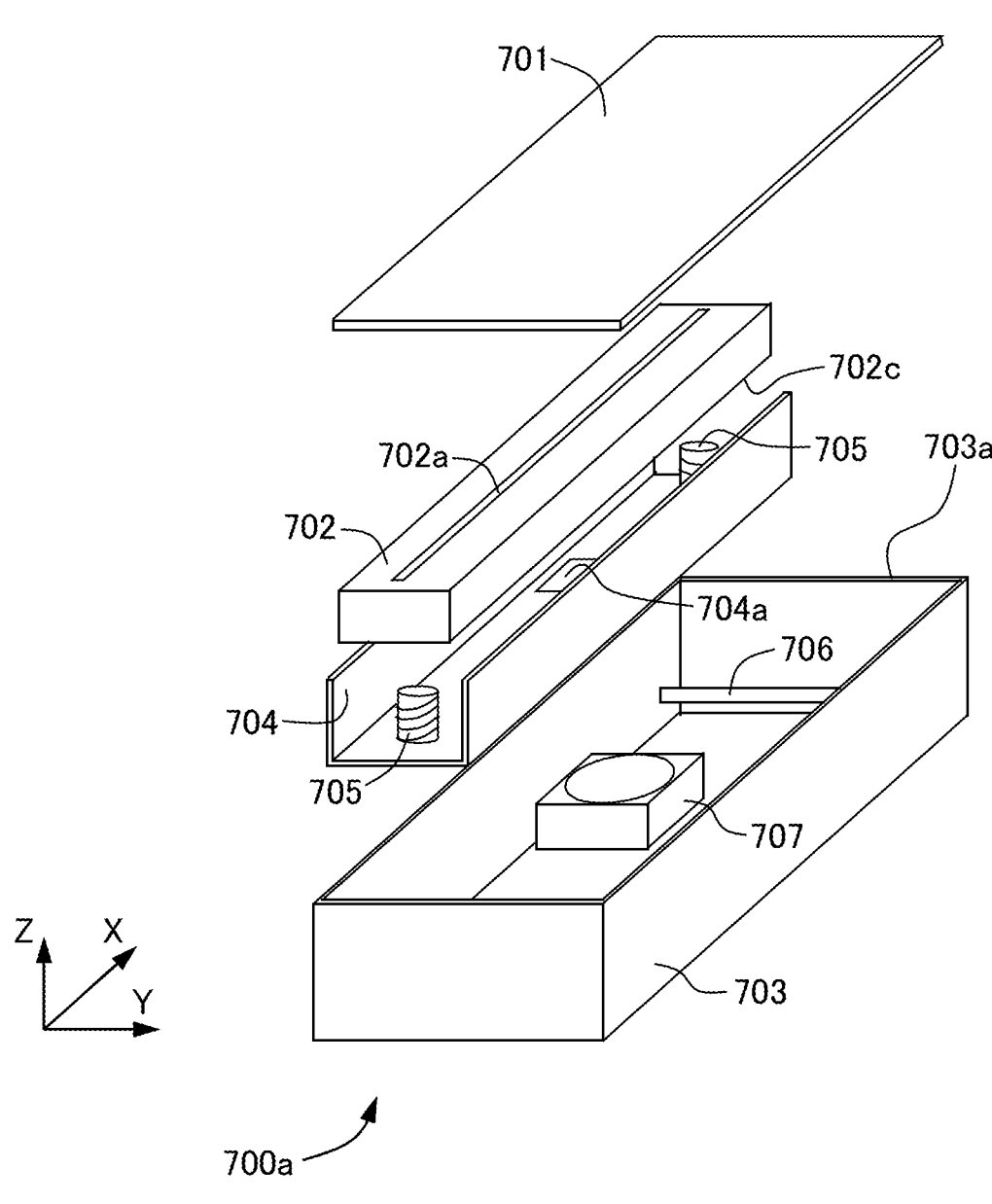
FIG. 4 is an exploded perspective view illustrating the reading unit of the first embodiment.

Next, using FIGS. 4 and 5A, internal configurations of the reading units 700a and 700b will be described. To be noted, since the reading units 700a and 700b are configured substantially in the same shape but arranged in a manner of being oriented inversely to each other, only the internal configuration of the reading unit 700a for reading the back side will be described. In the descriptions below, an X direction, a Y direction, and a Z direction respectively indicate a main scanning direction (longitudinal direction), the sheet conveyance direction (short-side direction), and an upper and lower direction.

The reading unit 700a includes the CIS 702 that can perform readings over the whole area of the largest passable paper size in the X direction. The CIS 702 is an example of a sensor unit that reads the image of the sheet S conveyed in the sheet conveyance direction via the transparent member 701. This CIS 702 can read, for example, the whole area of a 13-inch sheet. The CIS 702 of this embodiment includes an image reading element 702a on a side of the transparent member 701, and a substrate 702b on the back side of the image reading element 702a. The CIS 702 is packaged, and includes a heat dissipating surface 702c that is an example of a facing wall that faces the substrate 702b in a manner of covering the substrate 702b. The heat dissipating surface 702c is an external surface on a side on which the substrate 702b is disposed in the CIS 702. To be noted, in a case where the substrate 702b is exposed outside of the CIS 702, the heat dissipating surface 702c becomes a back surface of the substrate 702b. Numerous heat generating components such as an analog front end (AFE) that is an analog circuit connecting a signal detection device and a digital signal processing device are mounted onto the substrate 702b. That is, the CIS 702 includes the substrate 702b to which the image reading element 702a is connected, and the heat dissipating surface 702c is a surface on a side onto which the substrate 702b is fitted.

At both end portions in the X direction, the CIS 702 are supported by the CIS holder 704 via urging springs 705 urging the CIS 702 to the transparent member 701. That is, the CIS holder 704 holds the CIS 702 via the urging springs 705. The CIS holder 704 includes a vent hole 704a that is an example of an opening formed in a position facing the CIS 702. In the present embodiment, the vent hole 704a is formed in a position facing the heat dissipating surface 702c. Here, the vent hole 704a is formed in a position where the vent hole 704a faces the heat dissipating surface 702c on a side opposite to the CIS 702 with respect to the heat dissipating surface 702c. The urging springs 705 are examples of a pair of elastic members that urge the CIS 702 toward the transparent member 701, and the vent hole 704a is arranged between the urging springs 705. The urging springs 705 elastically support both end portions of the heat dissipating surface 702c of the CIS 702 with respect to the CIS holder 704.

The CIS holder 704 is disposed between the CIS 702 and the axial fan 707, and is an example of a supporting member supporting the CIS 702. Holding shafts 706 supporting the CIS holder 704 in a manner capable of sliding the CIS holder 704 in the sheet conveyance direction (Y direction) are disposed at both end portions of the casing 703 in the X direction. The CIS holder 704 is moved by a slide driving unit, not shown. These holding shafts 706 and slide driving unit are examples of a moving unit that enables the CIS holder 704 to move in the sheet conveyance direction in an interior of the casing 703 to a reading position P1, described below, and to a shading position P2 different from the reading position P1. In the interior of the casing 703, the moving unit moves the CIS holder 704 to the reading position P1 (first position) and to the shading position P2 (second position) that is different from the reading position P1. Further, the reading unit 700a includes the axial fan 707 arranged substantially in a center of the casing 703 in the X direction and directly under the substrate 702b, and a fan support plate 708 supporting the axial fan 707 and secured to the casing 703. To be noted, the fan support plate 708 includes an opening portion through which the air can flow.

On the other side, with respect to the vent hole 704a, of the CIS 702, the axial fan 707 is arranged in a manner of facing the vent hole 704a. The axial fan 707 blows air toward the vent hole 704a. Thereby, flow paths of the air that has passed through the vent hole 704a are formed between the CIS 702 and the CIS holder 704.

The urging spring 705 stabilizes a focal depth of the CIS 702 by urging and abutting the CIS 702 with respect to the transparent member 701.

Figure 5A:
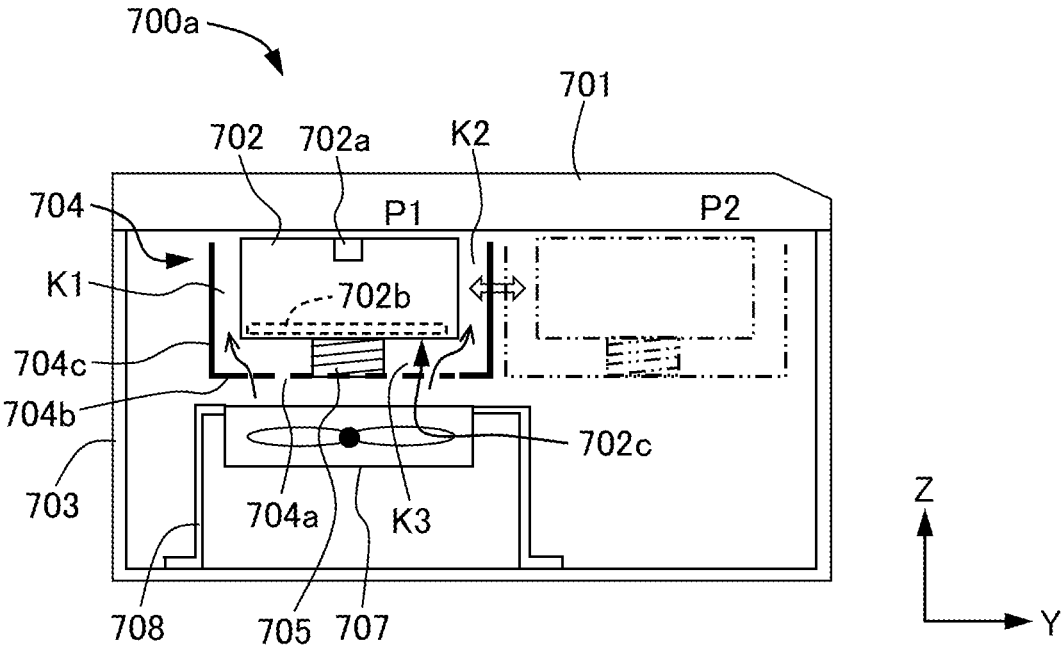
FIG. 5A is a cross-sectional view illustrating a case where, in the reading unit of the first embodiment, a heat dissipating surface is located in a lower part.
Figure 5B:
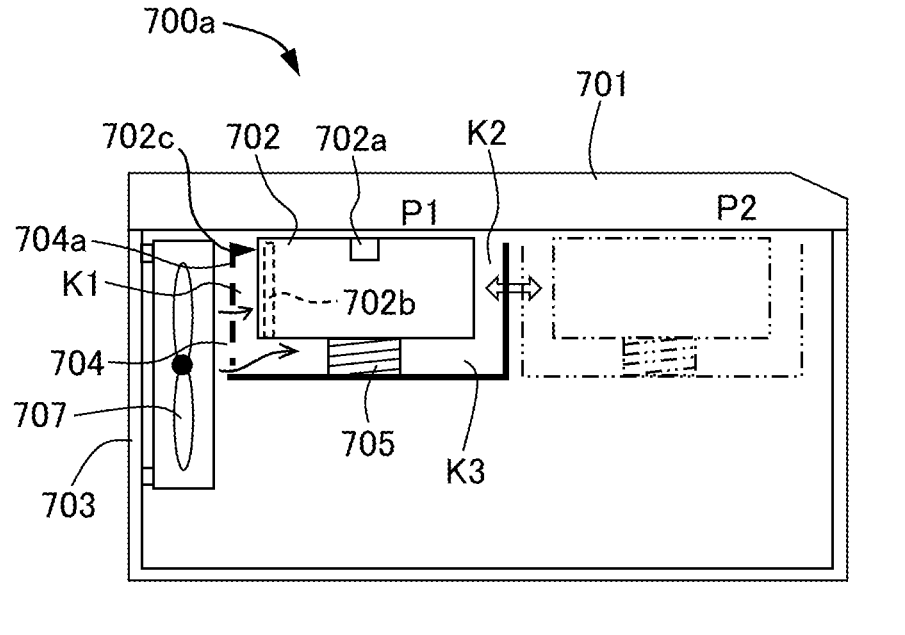
FIG. 5B is a cross-sectional view illustrating a case where, in the reading unit of the first embodiment, the heat dissipating surface is located on a lateral side.
Figure 5B:
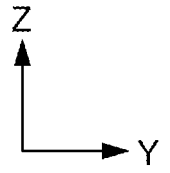

While, in the present embodiment, as illustrated in FIG. 5A, the axial fan 707 is arranged in a manner of facing an external surface of a bottom portion of the CIS 702, in a case where, as illustrated in FIG. 5B, the substrate 702b is arranged on a side surface of the CIS 702, the axial fan 707 is preferably arranged on a side of the side surface of the casing 703.

During an operation of the image forming system 1, the CIS 702 and the CIS holder 704 slides from the reading position P1, indicated by solid lines in FIG. 5A, in the Y direction at predetermined intervals, and can move to the shading position P2 indicated by chain-double dashed lines in FIG. 5A. In the shading position P2, calibration is performed by reading a white reference plate, not shown, and reading accuracy is maintained.

In the present embodiment, as illustrated in FIG. 5A, the axial fan 707 is arranged on a side of the reading position P1 of the CIS 702. That is, when the CIS holder 704 is positioned in the reading position P1, the axial fan 707 faces the vent hole 704a. This is because, since the duration of time during which the CIS 702 is in the reading position P1 exceeds a time in the shading position P2, it is possible to achieve a higher cooling effect. In a case where a time in the shading position P2 is longer than a time in the reading position P1, it is acceptable to arrange the axial fan 707 on a side of the shading position P2. The axial fan 707 is arranged to face the vent hole 704a that is in a position in which the CIS 702 stays for an extended time between the reading position P1 and the shading position P2.

Figure 6:
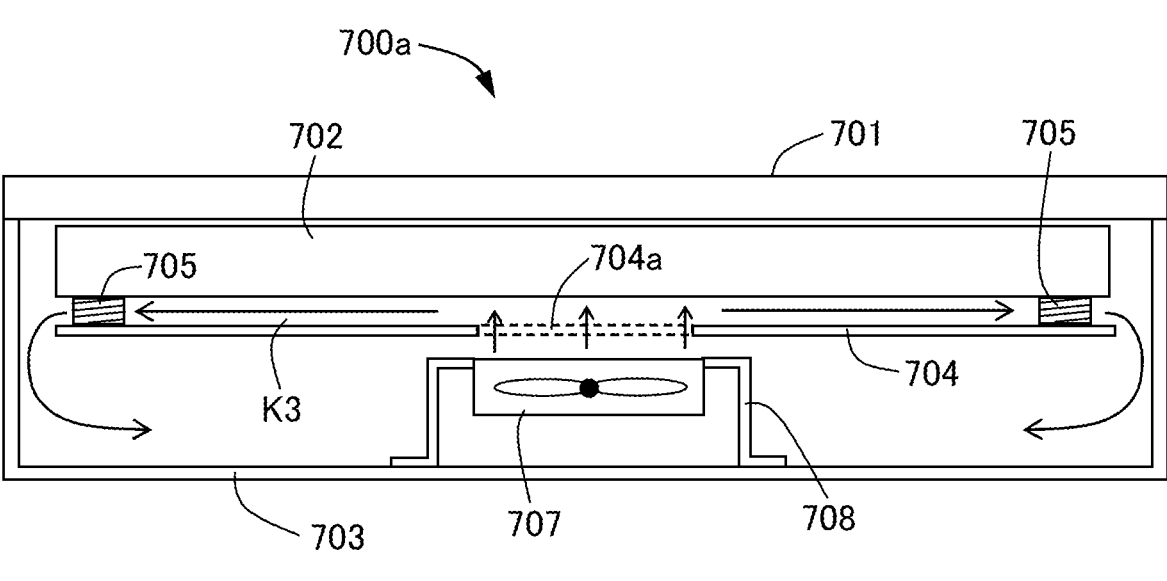
FIG. 6 is a longitudinal cross-sectional view illustrating the reading unit of the first embodiment.

As illustrated in FIGS. 5A and 6, the CIS holder 704 has a rectangular shape with one side open, and, by arranging the transparent member 701 on a side of an opening surface, forms a duct including the CIS 702 inside. The CIS holder 704 includes a bottom surface 704b facing the CIS 702, and a side surfaces 704c, serving as a side wall, that are intersected with (for example, perpendicularly to) the bottom surface 704b and project to the transparent member 701. In the present embodiment, the side surfaces 704c are disposed on both sides in a manner of sandwiching the CIS 702 in the Y direction. The CIS 702 is disposed such that, when viewed in the sheet conveyance direction (Y direction), at least part of the CIS 702 overlaps the side surfaces 704c.

Gaps are disposed in contact portions of the transparent member 701 and the CIS holder 704 for a shading correction operation described above. Further, the vent hole 704a (opening) is disposed in the CIS holder 704 for drawing the air to a facing portion of the axial fan 707. The air from the axial fan 707, which has flowed in through the vent hole 704a, is distributed to the front side and the back side, passes through gaps K1, K2, and K3 between the CIS holder 704 and the CIS 702, and flows to both end portions of the CIS holder 704 in the X direction while exchanging the heat with the CIS 702. The air that has reached both the end portions forms airflow that passes through the outside of the CIS holder 704 and returns again to the axial fan 707 substantially in a center. That is, the heat dissipating surface 702c faces the CIS holder 704, and the CIS 702 is arranged to form the flow paths with the CIS holder 704 in between. The gaps K1, K2, and K3 are examples of the flow paths. Further, in the present embodiment, the CIS holder 704 includes the vent hole 704a formed in a position facing the heat dissipating surface 702c on a side on which the substrate 702b in the CIS 702 is disposed, and the axial fan 707 is arranged in a manner of facing the vent hole 704a.

Further, the CIS 702 aligns its short-side direction along the Y direction, and establishes its longitudinal direction along the X direction perpendicular to both the short-side direction and the Z direction that is an optical axis direction of the CIS 702. Then, the heat dissipating surface 702c includes first regions located at both end portions of the CIS 702 in the longitudinal direction and a second region located between the first regions in the longitudinal direction, and the vent hole 704a is arranged in a manner of facing the second region of the heat dissipating surface 702c. In particular, in the present embodiment, the vent hole 704a is arranged in a manner of facing the center portion of the heat dissipating surface 702c in the longitudinal direction. Further, for example, even if the vent hole 704a is arranged in a position facing an end portion of the second region in the longitudinal direction, the air passed through the vent hole 704a comes into contact with the heat dissipating surface 702c, and branches to both sides in the X direction. Therefore, in comparison with a case where the air is blown in from a position facing an end portion of the CIS 702 in the longitudinal direction and flows only in one direction, it is possible to reduce temperature variations of the CIS 702 in the longitudinal direction.

Here, in a conventional configuration in which the axial fan is disposed in a position facing one end portion of the CIS 702 in the longitudinal direction, since the air flows from the one end portion of the CIS 702 to the other, a circulation path is extended. Therefore, since, on a side of the CIS 702 away from the axial fan 707 in the longitudinal direction, a temperature of the air rises and heat exchange efficiency with the CIS 702 gradually declines, it becomes difficult to decrease a temperature on the side of the CIS 702 away from the axial fan 707, and the temperature variations occur in the CIS 702 in the longitudinal direction. On the other hand, since, in the present embodiment, by arranging the axial fan 707 substantially in a center of the CIS 702, the airflow is distributed to the front side and the back side substantially from the center of the CIS 702, cooling efficiency on the front side and back side is equalized, and it is possible to reduce the temperature variations in the longitudinal direction. Further, by arranging the axial fan 707 substantially in the center of the CIS 702, it is possible to cool efficiently by shortening the circulation path and suppressing a temperature rise of the air.

FIG. 7 illustrates a difference in air velocities on the front side and the back side in a case where the axil fan 707 is moved from the center of the CIS 702 to the back side in the longitudinal direction. A movement ratio is determined by a movement amount of the axial fan 707 with respect to the whole length of the CIS 702 in the X direction. From FIG. 7, it is confirmed that a certain effect can be obtained by positioning the axial fan 707 within equal to or less than ±40% of the whole length (X direction) of the CIS 702, and particularly high effect can be obtained when the axial fan 707 is positioned within equal to or less than ±20% of the whole length of the CIS 702.

As described above, according to the reading unit 700a of the present embodiment, the CIS holder 704 includes the vent hole 704a facing the center portion of the heat dissipating surface 702c, and the axial fan 707 is arranged in a manner of facing the vent hole 704a. Therefore, since the airflow is distributed to the front side and the back side substantially from the center of the CIS 702, the temperature variations in the longitudinal direction can be reduced as the cooling efficiency on the front side and the back side is equalized, and it is possible to improve the reading accuracy by suppressing a decrease in the reading accuracy resulting from the temperature variations.

Further, according to the reading unit 700*a* of the present embodiment, by arranging the axial fan 707 substantially in the center of the CIS 702, the circulation path can be shortened, and, by suppressing the temperature rise of the air, it is possible to cool efficiently. As described above, since it is possible to average temperature gradients in the longitudinal direction generated when the heat is generated at the image reading element 702*a* and the substrate 702*b* of the CIS 702, it is possible to effectively suppress the temperature rise of the CIS 702, while suppressing a worsening of the reading accuracy due to the dust and dirt.

To be noted, while, in the present embodiment described above, the case where the air is blown toward the vent hole 704*a* is described, it is not limited to this, and it is acceptable that the air blows in a direction in which the air is drawn from the vent hole 704*a*. In this case, the air is directed to flow from both the end portions of the CIS 702 toward the center portion. In this case, also, by equalizing the coiling efficiency on the front side and the back side of the CIS 702 and reducing the temperature variations in the longitudinal direction, it is possible to improve the reading accuracy by suppressing the decrease in the reading accuracy resulting from the temperature variations.

Second Embodiment

Figure 8:
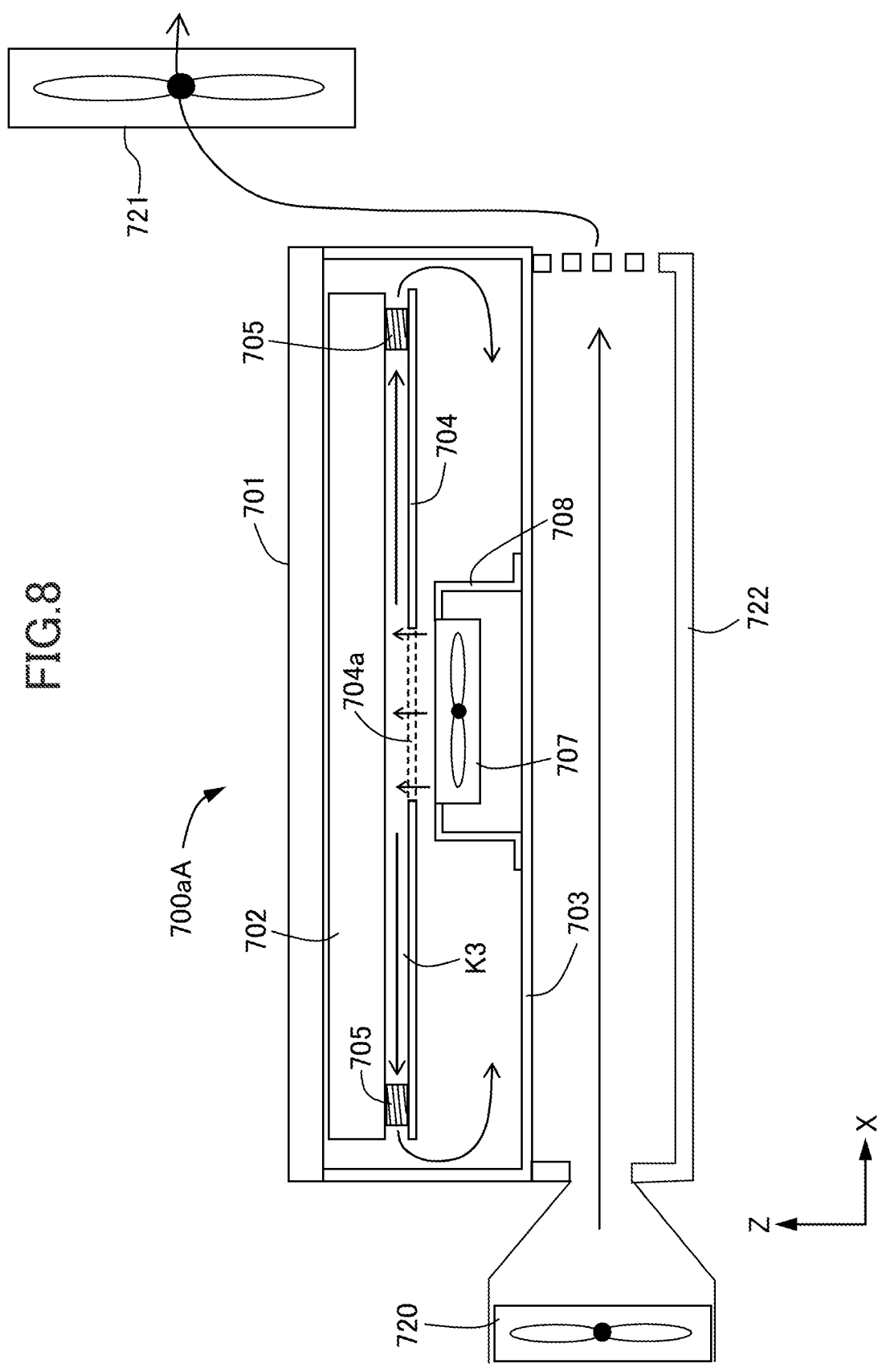
FIG. 8 is a longitudinal cross-sectional view illustrating a reading unit of a second embodiment.

Next, with reference to FIG. 8, a second embodiment of this disclosure will be described in detail. A reading unit 700*a*A of the present embodiment differs from the first embodiment in a configuration in which a duct 722 for a cooling purpose is disposed outside of the casing 703. However, since configurations other than the above are similar to the first embodiment, by putting the same reference characters, the detailed descriptions of the configurations similar to the first embodiment will be omitted herein.

In the present embodiment, the duct 722, serving as an example of a duct portion, is disposed on an external surface of a bottom portion of the casing 703. To the duct 722, an upstream fan 720 and a downstream fan 721, serving as examples of airflow generation units assisting a cooling effect of the axial fan 707 by passing the air through the duct 722 are respectively arranged upstream and downstream of the duct 722 in an airflow direction of the duct 722. The upstream fan 720 is disposed in a manner of communicating with one side end of end portions of the duct 722 in a flow path direction, and supplies the air to the duct 722. The downstream fan 721 is disposed in a manner of communicating with another side end of the end portions of the duct 722 in the flow path direction, and suctions the air from the duct 722. To be noted, while, in the present embodiment, two fans are used as the airflow generation units, it is not limited to this, and it is acceptable to use one or equal to or more than three fans.

By generating the airflow inside of the duct 722 formed on the bottom portion of the casing 703, the upstream fan 720 indirectly reduces a temperature in an interior of a housing space of the CIS 702. Further, similar to the upstream fan 720, the downstream fan 721 indirectly reduces the temperature in the interior of the housing space of the CIS 702, along with exhausting the heat of the whole adjusting apparatus 40.

As described above, according to the reading unit 700 of the present embodiment, since, by disposing the duct 722 on the external surface of the casing 703, it is possible to reduce the temperature in the interior of the housing space of the CIS 702, it is possible to improve the cooling efficiency of the CIS 702.

Third Embodiment

Next, with reference to FIGS. 9 and 10, a third embodiment of this disclosure will be described in detail. A reading unit 700*a*B of the present embodiment differs from the first embodiment in a configuration in which the casing 703 includes two chambers that are different in a function. However, since configurations other than the above are similar to the first embodiment, by putting the same reference characters, the detailed descriptions of the configurations similar to the first embodiment will be omitted herein.

Figure 9:
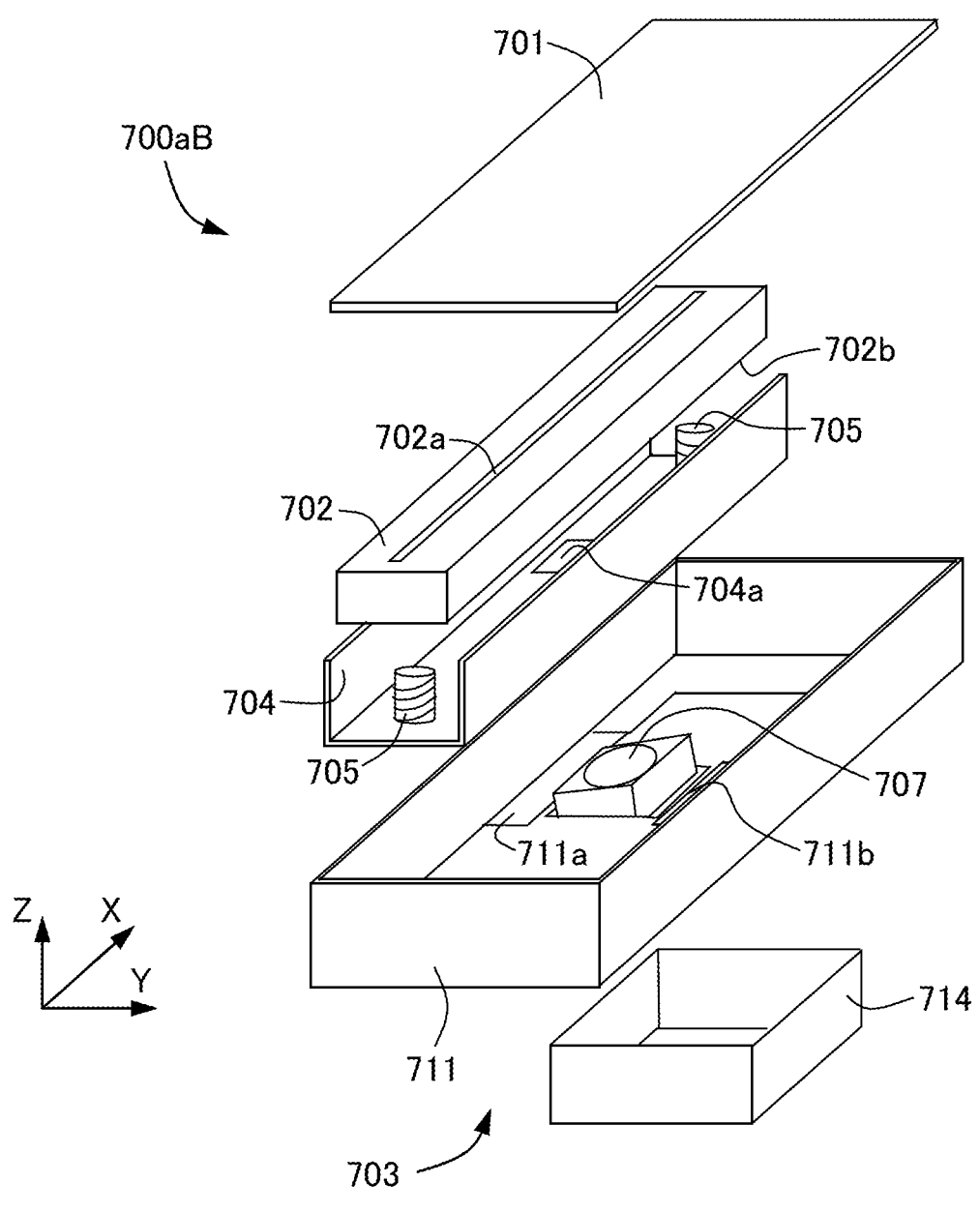
FIG. 9 is an exploded perspective view illustrating a reading unit of a third embodiment.

FIG. 9 is a diagram illustrating an internal configuration of aback surface reading unit 700*a*B. The casing 703 includes a partition wall 711 that divides an interior into a first chamber C1 and a second chamber C2. The CIS 702 and the CIS holder 704 are housed in the first chamber C1. The partition wall 711 includes communicating holes 711*a* and 711*b* through which the first and second chambers C1 and C2 communicate. Two communicating holes 711*a* and 711*b* are respectively arranged adjacently to each of both end portions of the axial fan 707 in the Y direction. The axial fan 707 is disposed in a manner of penetrating through the partition wall 711, and blows the air in a position between the first and second chambers C1 and C2. The casing 703 forms the quasi-sealed space with the transparent member 701.

Figure 10:
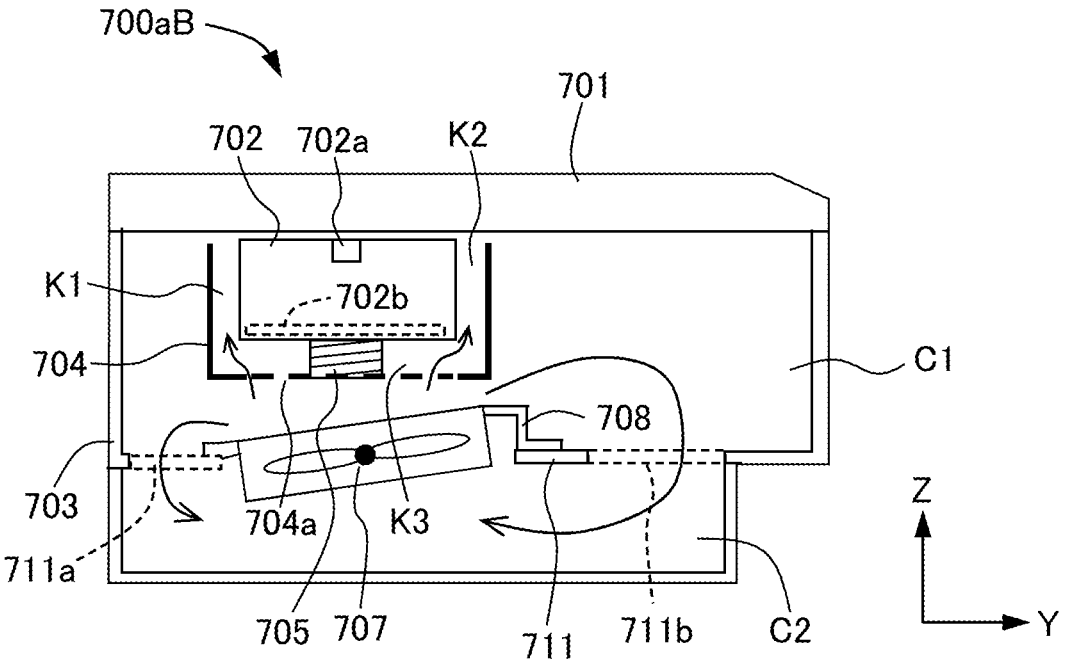
FIG. 10 is a cross-sectional view illustrating the reading unit of the third embodiment.

As illustrated in FIG. 10, the axial fan 707 suctions the air from the second chamber C2, and generates the airflow in the Z direction. In the present embodiment, by arranging a downstream side of the axial fan 707 in the sheet conveyance direction in a manner inclined toward a side of the CIS 702 around an axis in the X direction as a center, the air that does not enter the vent hole 704*a* becomes easier to move toward the communicating hole 711*a*. The axial fan 707 is arranged to blow the air in a direction inclined with respect to a center line of the vent hole 704*a*. That is, the axial fan 707 is arranged to blow the air in a direction inclined with respect to a surface in which the vent hole 704*a* of the CIS holder 704 is formed. However, an inclination of the axial fan 707 is not limited to this, and it is acceptable that the axial fan 707 is inclined in a direction that orients in the Z direction, or that, by arranging an upstream side of the axial fan 707 in the sheet conveyance direction in a manner inclined toward the side of the CIS 702, the air becomes easier to move toward the communicating hole 711*b*.

The airflow that has been generated flows from the vent hole 704*a* to the end portions of the CIS holder 704 in the X direction via the gaps K1, K2, and K3. Since the air that has not entered the vent hole 704*a* forms the airflow that passes the communicating holes 711*a* and 711*b* and returns to the axial fan 707 via the second chamber C2, a pressure loss on a suction side of the axial fan 707 is reduced, and the cooling efficiency is improved.

As described above, according to the reading unit 700*a*B of the present embodiment, by disposing the two communicating holes 711*a* and 711*b* adjacently to both the end portions of the axial fan 707 in the sheet conveyance direction, and disposing the second chamber C2, it becomes possible to circulate the air efficiently. Thereby, it is possible to more efficiently suppress the occurrence of the temperature variations of the image reading element and the substrate 702*b* of the CIS 702 in the longitudinal direction.

According to this disclosure, it is possible to improve the reading accuracy of the image reading apparatus.

OTHER EMBODIMENTS

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2022-202440, filed Dec. 19, 2022 which is hereby incorporated by reference herein in its entirety.

What is claimed is:

1. An image reading apparatus configured to read an image on a sheet conveyed from an image forming apparatus that forms the image on the sheet, the image reading apparatus comprising:
   a conveyance unit configured to convey the sheet in a sheet conveyance direction; and
   a reading unit configured to read image information of the sheet,
   wherein the reading unit includes:
      a transparent member;
      a sensor unit including a substrate to which an image reading element is connected, and configured to read an image of the sheet through the transparent member;
      a fan configured to blow air;
      a supporting member including an opening formed at a position where the opening faces the sensor unit, and configured to support the sensor unit; and
      a casing configured to accommodate the sensor unit, the fan, and the supporting member,
   wherein the fan is disposed in a manner of facing the opening of the supporting member on a side, with respect to the opening, different from a side on which the sensor unit faces the opening, and
   wherein the sensor unit and the supporting member are disposed such that a flow path of air that has passed through the opening of the supporting member is formed between the sensor unit and the supporting member.

2. The image reading apparatus according to claim 1, wherein an external surface of the sensor unit includes first regions located in both end portions of the sensor unit in a longitudinal direction of the sensor unit, and a second region located between the first regions in the longitudinal direction, and
   wherein the opening is disposed in a manner of facing the second region of the external surface.

3. The image reading apparatus according to claim 2, wherein the opening is disposed in a manner of facing a center portion of the external surface in the longitudinal direction.

4. The image reading apparatus according to claim 1, wherein the fan is disposed to blow air toward the opening.

5. The image reading apparatus according to claim 1, wherein the sensor unit includes a facing wall that faces the substrate, and
   wherein the opening is formed in a position where the opening faces the facing wall on a side opposite to the sensor unit with respect to the facing wall.

6. The image reading apparatus according to claim 1, wherein the supporting member includes a bottom surface disposed between the fan and the sensor unit and facing the sensor unit, and a side wall that is intersected with the bottom surface and projects to a side of the sensor unit, and
   wherein, when viewed in the sheet conveyance direction, at least part of the sensor unit overlaps the side wall.

7. The image reading apparatus according to claim 1, further comprising:
   a pair of elastic members configured to urge the sensor unit toward the transparent member,
   wherein the opening is disposed between the pair of elastic members in a longitudinal direction of the sensor unit.

8. The image reading apparatus according to claim 1, further comprising:
   a moving unit configured to move the supporting member to a first position and a second position in the casing, the first position being a position where the sensor unit reads an image of the sheet, the second position being a position that is different from the first position,
   wherein, in a case where the supporting member is located in the first position, the fan faces the opening.

9. The image reading apparatus according to claim 1, further comprising:
   a duct portion disposed on an external surface of a bottom portion of the casing; and
   an airflow generation unit configured to pass air through the duct portion.

10. The image reading apparatus according to claim 9, wherein the airflow generation unit includes an upstream fan and a downstream fan,
   wherein the upstream fan is disposed in a manner of communicating with one side end of end portions of the duct portion in a flow path direction, and is configured to supply air to the duct portion, and
   wherein the downstream fan is disposed in a manner of communicating with another side end of the end portions of the duct portion in the flow path direction, and is configured to suction the air from the duct portion.

11. The image reading apparatus according to claim 1, wherein the casing includes a partition wall that divides an interior of the casing into a first chamber and a second chamber,
   wherein the first chamber is accommodated the sensor unit and the supporting member,
   wherein the partition wall includes a communicating hole through which the first chamber and the second chamber communicate, and
   wherein the fan is disposed at the partition wall, and the fan is configured to blow air between the first chamber and the second chamber.

12. The image reading apparatus according to claim 1, wherein the fan is disposed to blow the air in a direction that is inclined with respect to a surface in which the opening of the supporting member is formed.

13. An image forming system comprising:
   an image forming apparatus configured to form an image on a sheet; and
   an image reading apparatus including a reading unit configured to read the image of the sheet conveyed from the image forming apparatus,
   wherein the reading unit includes:
      a transparent member;
      a sensor unit including a substrate to which an image reading element is connected, and is configured to read the image of the sheet through the transparent member;
      a fan configured to blow air;

a supporting member including an opening formed at a position where the opening faces the sensor unit, and configured to support the sensor unit; and a casing configured to accommodate the sensor unit, the fan, and the supporting member, wherein the fan is disposed in a manner of facing the opening of the supporting member on a side, with respect to the opening, different from a side on which the sensor unit faces the opening, and wherein the sensor unit and the supporting member are disposed such that a flow path of air that has passed through the opening of the supporting member is formed between the sensor unit and the supporting member.

* * * * *